(12) United States Patent
Grafmiller et al.

(10) Patent No.: US 11,148,888 B1
(45) Date of Patent: Oct. 19, 2021

(54) LOW FORCE SEALING PNEUMATIC CARRIER

(71) Applicant: TRANSLOGIC CORPORATION, Broomfield, CO (US)

(72) Inventors: Craig Grafmiller, Castle Pines, CO (US); Daniel Serafin, Thornton, CO (US)

(73) Assignee: Translogic Corporation, Broomfield, CO (US)

(*) Notice: Subject to any disclaimer, the term of this patent is extended or adjusted under 35 U.S.C. 154(b) by 0 days.

(21) Appl. No.: 16/893,789

(22) Filed: Jun. 5, 2020

(51) Int. Cl.
| B65G 51/06 | (2006.01) |
| B65G 51/04 | (2006.01) |
| E05C 1/04 | (2006.01) |
| E05C 1/00 | (2006.01) |

(52) U.S. Cl.
CPC .............. *B65G 51/06* (2013.01); *B65G 51/04* (2013.01); *B65G 2207/48* (2013.01); *E05C 1/006* (2013.01); *E05C 1/04* (2013.01)

(58) Field of Classification Search
CPC ......... B65G 51/04; B65G 51/06; E05C 1/006; E05C 1/04
See application file for complete search history.

(56) References Cited

U.S. PATENT DOCUMENTS

| 726,022 A | 4/1903 | Burton |
| 3,593,948 A | 7/1971 | McClellan |
| 3,787,007 A | 1/1974 | Alexandrov et al. |
| 3,787,008 A | 1/1974 | Barnett et al. |
| 3,825,210 A | 7/1974 | Weaver |
| 4,006,868 A | 2/1977 | Hochradel et al. |
| 4,114,835 A | 9/1978 | Alexandrov et al. |
| RE30,882 E | 3/1982 | Leavelle |
| 4,324,511 A | 4/1982 | Irish |
| 4,362,443 A | 12/1982 | Mallory et al. |
| 4,470,730 A | 9/1984 | Wuthrich |
| 4,758,004 A * | 7/1988 | Semon ............... F16J 15/10 277/648 |
| 4,941,777 A | 7/1990 | Kieronski |
| 4,948,303 A | 8/1990 | Good |
| 5,092,714 A | 3/1992 | Porter et al. |
| 5,181,805 A | 1/1993 | Grosswiller et al. |
| 5,181,806 A | 1/1993 | Grosswiller et al. |
| 5,181,807 A | 1/1993 | Anders |
| 5,368,417 A | 11/1994 | Benjamin et al. |
| 5,518,545 A | 5/1996 | Miyano |
| 5,538,366 A | 7/1996 | Piland et al. |
| 5,562,591 A | 10/1996 | Marchand et al. |
| 5,573,356 A | 11/1996 | Henderson |

(Continued)

*Primary Examiner* — William R Harp (74) *Attorney, Agent, or Firm* — Russell Manning; FisherBroyles, LLP (57) ABSTRACT

Provided herein is a pneumatic carrier having a leak resistant cargo area where first and second mating shells form the carrier. To provide a leak resistant cargo area, the one embodiment of the carrier employs a cantilevered sealing element on a first sealing periphery of the first shell. A free end of the cantilevered sealing element is configured to engage a sloped surface on a second shell. As the shells close, the sealing element slides down the sloped surface to form a seal between the shells. The use of the cantilevered sealing element in conjunction with the sloped surface reduces the compressive force required to form a seal between the shells.

11 Claims, 10 Drawing Sheets

(56) References Cited

U.S. PATENT DOCUMENTS

| | | | |
|---|---|---|---|
| 5,636,947 | A | 6/1997 | Valerino, Sr. et al. |
| 5,655,677 | A | 8/1997 | Fratello et al. |
| 5,980,164 | A | 11/1999 | Fratello |
| D520,136 | S | 5/2006 | Keller et al. |
| 7,097,391 | B1 | 8/2006 | Keller et al. |
| 7,241,081 | B1 | 7/2007 | Keller et al. |
| 7,413,099 | B2 | 8/2008 | Takahashi et al. |
| 7,455,481 | B1 | 11/2008 | Keller et al. |
| 8,267,622 | B1 * | 9/2012 | MacLean-Blevins ......... B65G 51/06 406/186 |
| 8,269,104 | B2 * | 9/2012 | Choraku ............ H04M 1/0249 174/50.5 |
| 9,073,708 | B2 | 7/2015 | Miller |
| 2011/0274505 | A1 | 11/2011 | Hoganson |
| 2011/0286808 | A1 | 11/2011 | Castro |

\* cited by examiner

LOW FORCE SEALING PNEUMATIC CARRIER

FIELD

The present disclosure relates to carrier vessels for use with pneumatic tube transport systems. More particularly, aspects of the present disclosure relate to a two-part carrier vessel having a low force seal arrangement that provides a substantially leak-proof connection between contacting surfaces of the carrier vessel when closed.

BACKGROUND

Many buildings include pneumatic tube transport systems for transporting objects, such as products, components, documents, drawings or other materials from one location in the building to another. Pneumatic tube transport systems typically comprise a number of at least partially sealed tubes extending between locations in a building and a mechanism for selectively evacuating air from, or forcing air into, the tubes. In use, objects are placed in a carrier vessel, typically a substantially cylindrical housing, which is placed into the pneumatic tube transport system. The vessel is then propelled through the tube by creating a zone of relatively higher pressure on one side of the carrier vessel than on the other. This may be accomplished by creating a zone of negative pressure (e.g. a vacuum) in front of the vessel or by creating a zone of positive pressure behind the vessel.

In certain settings, packages housing fluids need to be transported using the pneumatic tube transport system. For example, in the health care settings (e.g., hospitals), pneumatic tube transport systems transport fluids such as laboratory samples, blood samples, and/or intravenous bags. When using pneumatic tube transport systems in health care settings, it is desirable that the carriers, upon closure, seal to provide leak-resistant containment of fluids, which may unwontedly spill from their primary containers into the carrier. Fluids spilling from their primary container inside the carrier may leak from the carrier into the pneumatic tube system posing a contamination risk and/or result in the pneumatic tube system improperly functioning due to the presence of fluid in the system.

Various attempts have been made to produce leak-proof or sealing pneumatic carriers. However, such carriers have suffered from various drawbacks. For instance, many prior sealing carriers have utilized a flat gasket or O-ring that forms a seal, upon compression between mating surfaces of the opposing shells of the pneumatic carrier. Such gaskets or O-rings typically require a significant compressive force to achieve a leak-proof seal (i.e., energize the seal).

SUMMARY

The present inventors have recognized that prior art sealing carriers often provide an ineffective seal due to the amount of compressive force required to energize a sealing element. Accordingly, provided herein are various pneumatic carrier sealing arrangements that allow for generating an effective seal in the presence of reduced compressive forces. In one aspect, a seal having at least a portion that is elongated (e.g., in cross-section) is disposed about a periphery of an engagement surface of a first carrier shell. The elongated portion of the seal cantilevers away from the engagement surface. When the first carrier shell engages a second carrier shell (i.e., the pneumatic carrier is closed) cantilevered portion of the seal engages a mating sloped surface about a mating engagement surface of second carrier shell. The use of the cantilevered seal and the sloping surface reduces the normal force needed to energize the seal as a distal tip of the cantilevered seal slides along the sloped surface. Further the use of the cantilevered seal and the sloped surface may increase the surface area contact between the seal and the mating engagement surface of the second carrier.

One aspect of the present disclosure is directed to a sealing pneumatic carrier. The carrier includes first and second shell members having mating engagement surfaces. The carriers are pivotally connected to permit movement between an open position and a closed position where mating engagement surfaces are juxtaposed. The engagement surfaces each define a sealing periphery that extends around a portion of each respective shell. A cantilevered sealing element is disposed on one of the peripheries of one of the engagement surfaces. A free end of the cantilevered sealing element is configured to engage a sloped surface formed around the periphery of the other engagement surface. The sloped surface is disposed at an angle relative to a plane defined by a closed geometric shape of the sealing periphery. When the first and second shell members are juxtaposed to close the pneumatic carrier, the free end of the cantilevered sealing element engages the sloped surface to form a substantially fluid-tight seal between the first and second shell members.

The cantilevered sealing element has one end (e.g., a base end) fixedly attached to the engagement surface. A second end of the sealing element (e.g., free end) extends away from the base end and the engagement surface. The free end of the cantilevered sealing element protrudes above the periphery of the shell and extends about the sealing periphery of the engagement surface. That is, at least a portion of a body of the seal between its base end its free tip is cantilevered above the first engagement surface. The cantilevered portion of the body of the seal extending above the engagement surface to the distal tip is typically elongated having a length greater than its width. However, it will be appreciated that a base end connected to the engagement surface may have a width greater than the width of the cantilevered portion of the sealing element. Upon closing, the sloped engagement surface of the other shell contacts the free end of the cantilevered sealing element forming a seal with a side surface of the elongated sealing element. In this regard, the sealing element may deflect along its length and move along the sloped surface.

In one arrangement, the base end of the elongated sealing element is adapted for disposition within a groove formed into the first engagement surface. In another arrangement, the base portion is attached (e.g., adhered, over-molded, etc.) directly to the first engagement surface. The sealing element may be formed of any material that provides desired compression and/or non-permeability. Such materials include, without limitations, elastomeric materials, natural rubbers, foams etc.

Additional advantages of the present invention will become readily apparent from the following discussion, particularly when taken together with the accompanying drawings.

DETAILED DESCRIPTION

Reference will now be made to the accompanying drawings, which assist in illustrating the various pertinent features of the present disclosure. Although the present disclosure is described primarily in conjunction with a side-opening carrier for use in a pneumatic tube transport system, it should be expressly understood that aspects of the present invention may be applicable to other carrier configurations including, without limitation, end-opening carriers. In this regard, the following description is presented for purposes of illustration and description.

Figure 1:
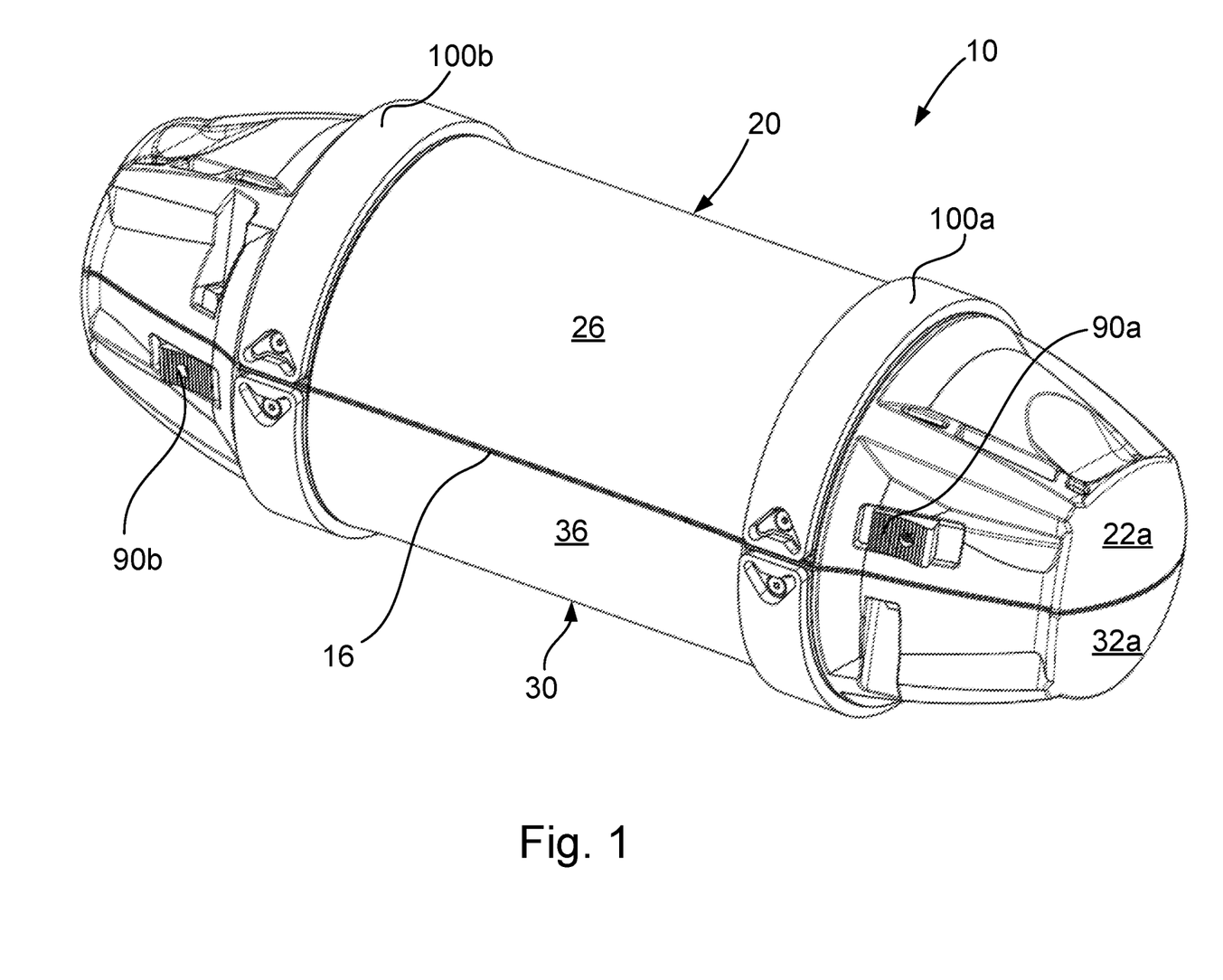
FIG. 1 is a perspective view of one embodiment of a carrier vessel when closed.
Figure 2:
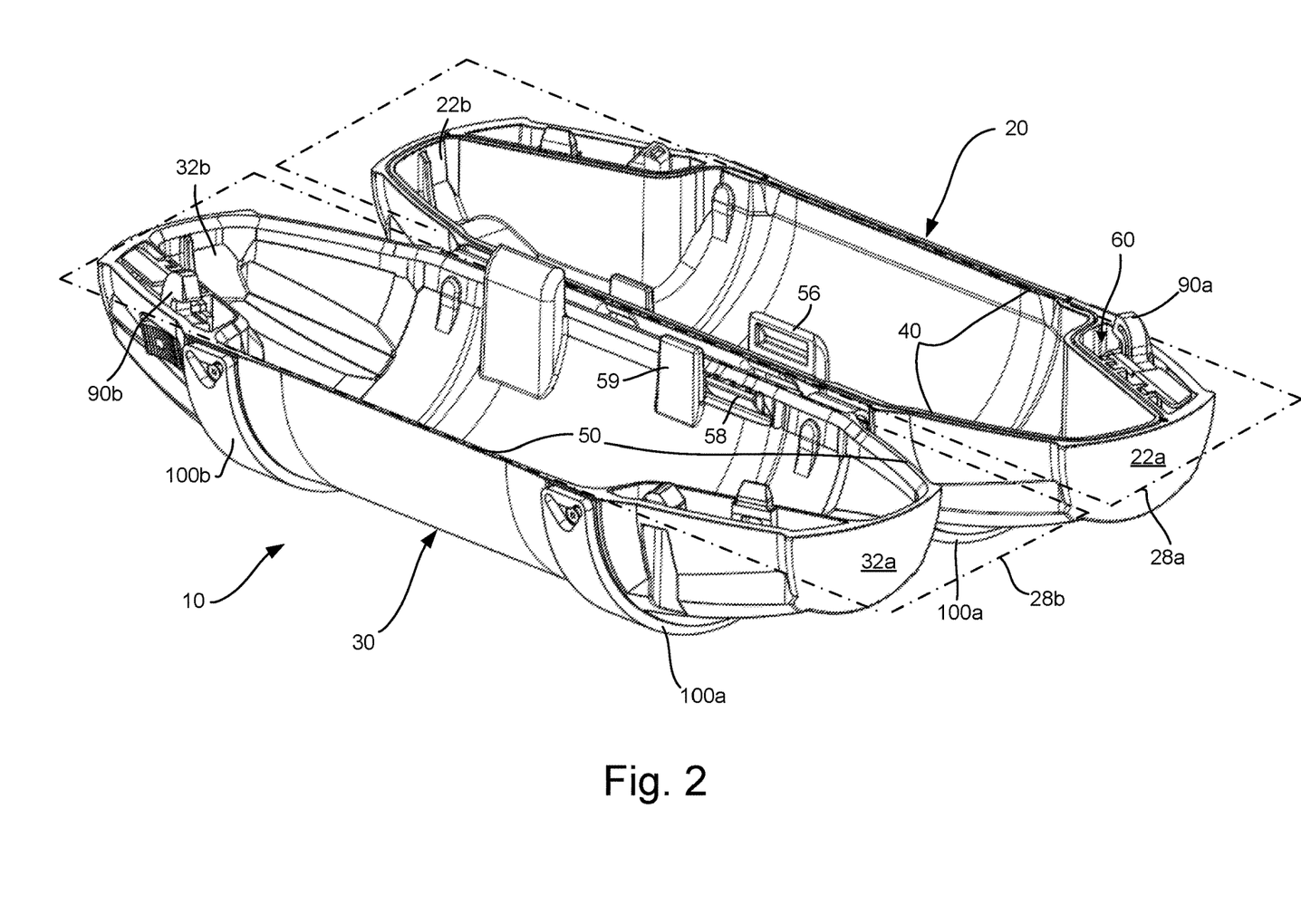
FIG. 2 shows a perspective view of one embodiment of a carrier vessel when opened.

FIGS. 1 and 2 illustrate one embodiment of a pneumatic carrier 10 (hereafter 'carrier'), which may be used to contain objects being transported in a pneumatic tube transport system. The carrier 10 includes a first shell member 20 and a second shell member 30 engageable along opposing engagement surfaces that at least partially define an interface 16 when the shell members are engaged (e.g., closed) to form a substantially cylindrical carrier vessel. Advantageously, when the first shell 20 and second shell 30 are secured, a substantially fluid-tight seal is formed between the two shell members to inhibit the passage of fluids into or out of the carrier 10. Accordingly, the carrier 10 may be used to transport containers that include fluids in a pneumatic tube transport system, with reduced concern of these fluids leaking from the transported container into the pneumatic tube transport system.

The first shell member 20 includes a semi-cylindrical sidewall 26 that extends between the first and second end walls 22a, 22b. The upper edges of the sidewall 26 and the end walls 22a, 22b generally define a first engagement surface 40, which extends about a sealing periphery of the first shell member 20. Stated otherwise, the engagement surface 40 defines a closed geometric shape about the sealing periphery of the first shell member. As shown, the closed geometric shape of the sealing periphery defines a first reference plane 28a. The second shell member 30 is similar in shape to the first shell member 20 and includes a semi-cylindrical sidewall 36 and first and second end walls 32a, 32b. Upper edges of the sidewall 36 and the end walls 32a, 32b define a second engagement surface 50 which extends substantially about a sealing periphery of the second shell member 30. As with the first engagement surface 40, the second engagement surface 50 is a closed geometric shape about the sealing periphery of the second shell member. As shown, the closed geometric shape of the sealing periphery defines a second reference plane 28b. Shell members 20, 30 may be formed from translucent and/or opaque rigid plastic materials, however it will be appreciated that numerous other materials, including metals or composite materials, could be used. When the first and second engagement surfaces 40, 50 are juxtaposed (i.e., the carrier is closed) the carrier defines a generally cylindrical vessel having an enclosed interior.

In the illustrated embodiment, two wear bands 100a, 100b (hereafter '100' unless specifically referenced) connect the first and second shell members 20, 30. In use, the wear bands 100 centrally position the carrier 10 within tubes of the pneumatic tube system. Further the wear bands 100 are pliable to create a seal across the carrier when positioned within such tubes. As illustrated, identical first and second wear bands 100 are attached at spaced locations along the sidewalls of the first shell member 20 and the second shell member 30. Further, each wear band 100 extends around and connects to each shell member 20, 30. In this embodiment, the pliable wear bands form the connection that permits movement (e.g., pivotal movement) between the first and second shell members 20, 30. One embodiment of such wear bands is disclosed in U.S. Pat. No. 5,655,677 to Fratello, the contents of which are incorporated herein by reference. To further facilitate closing of the carrier when wear bands form the pivotal connection between the shells, the shells may include mating studs 56, 58 that engage when the carrier closes. Each shell may also include one or more alignment tabs 59 that assist in aligning the shells when closed. Though illustrated as utilizing the wear bands 100 to form a pivotal connection between the shells 20, 30, it will be appreciated that other hinge assemblies may be utilized. One embodiment of such a hinge assembly is disclosed in U.S. Pat. No. 9,073,708 to Miller, the contents of which are incorporated herein by reference. In any embodiment, a pivotal coupling (e.g., wear bands, hinge, etc.) joins the first and second shell members 20, 30 together and permits pivotal movement therebetween. That is, the shells may move from an open configuration shown in FIG. 2 and a closed configuration shown in FIG. 1.

As illustrated in FIG. 2 first and second engagement surfaces 40, 50 extend generally around the sealing peripheries of the first and second shells 20, 30, respectively. In the present embodiment, latching assemblies 90a, 90b are disposed outside of the sealing peripheries defined by these engagement surfaces 40, 50. That is, the sealing peripheries of the engagement surfaces do not match the outside peripheries of the shells. Rather the engagement surfaces are disposed in-board of the latch assemblies 90a, 90b. As will be appreciated, this eliminates the need to seal these assemblies. Stated otherwise, the sealed periphery of the sealed enclosure defined by the engagement surfaces is free of intrusion by the latch assemblies 90. However, it will be appreciated that, in other embodiments, one or more of these assemblies may be disposed within the periphery of the seal element.

Prior attempts to provide a sealed carrier have primarily involved compressing a gasket (e.g., elastomeric seal) between the opposing shells. In such arrangements, a seal element or gasket is disposed about the periphery of an engagement surface of one of the shells. Often, such a gasket may have a lower end disposed within (e.g., adhered) a channel or groove extending about the periphery of the engagement surface. An upper edge or end of the gasket extends above the engagement surface. This portion of the gasket is commonly compressed against the surface of a mating engagement surface of the other shell. The compression partially deforms the gasket allowing it to conform with the mating engagement surface forming a seal. Such a sealing arrangement has numerous drawbacks. For instance, the engagement surfaces of the first and second shells are often not perfectly matched. As the shells are constructed of plastic materials they are subject to manufacturing tolerances and variations inherent in injection molding and other manufacturing processes. Stated otherwise, the shells are not necessarily perfectly symmetric. That is, the shells can be slightly warped resulting in less than optimal contact between the gasket and the mating engagement surface at various positions around their mating peripheries. In addition, the latches and/or hinges utilized to close the first and second shells are usually positioned irregularly around the perimeter of the carrier resulting in uneven force application around the peripheries of the engagement surfaces. Typically, this results in the seal located near the latch being over compressed and areas removed from the latch or hinge being under compressed. This is particularly problematic when low modulus materials (such as polycarbonates) are utilized to manufacture pneumatic tube carriers. The physical material lacks sufficient stiffness to provide the beam rigidity necessary to compress the seals without creating excessively thick carrier shells or applying high compressive forces making it difficult to close the carrier and energize the seal.

Provided herein is a pneumatic carrier sealing system and method that generates and effective seal between mating carrier shells without requiring high compressive forces to energize a sealing element. The ability to create an effective seal without application of high compressive forces between the engagement surfaces of the carrier shells is aided in the presented embodiments by the use of a cantilevered sealing element (i.e., in cross-section) that has an elongated portion that extends from the surface of one of the engagement surfaces. Once a base end of the elongated sealing element is attached about a periphery of one of the carrier shell engagement surfaces, an elongated body of the sealing element is cantilevered above the engagement surface. This elongated body of the sealing element engages an angled or sloped surface of a mating engagement surface. In this regard, rather than having to compress the sealing element to create a seal, the sealing element is deflected along a length of the cantilevered body while sliding down the sloped surface to form a seal between a side surface of the sealing element and the sloped surface. This reduces the force required to generate the seal as the body of the seal is generally deflected rather than compressed. Further, this arrangement accounts for variations in the engagement surfaces.

Figure 3A:
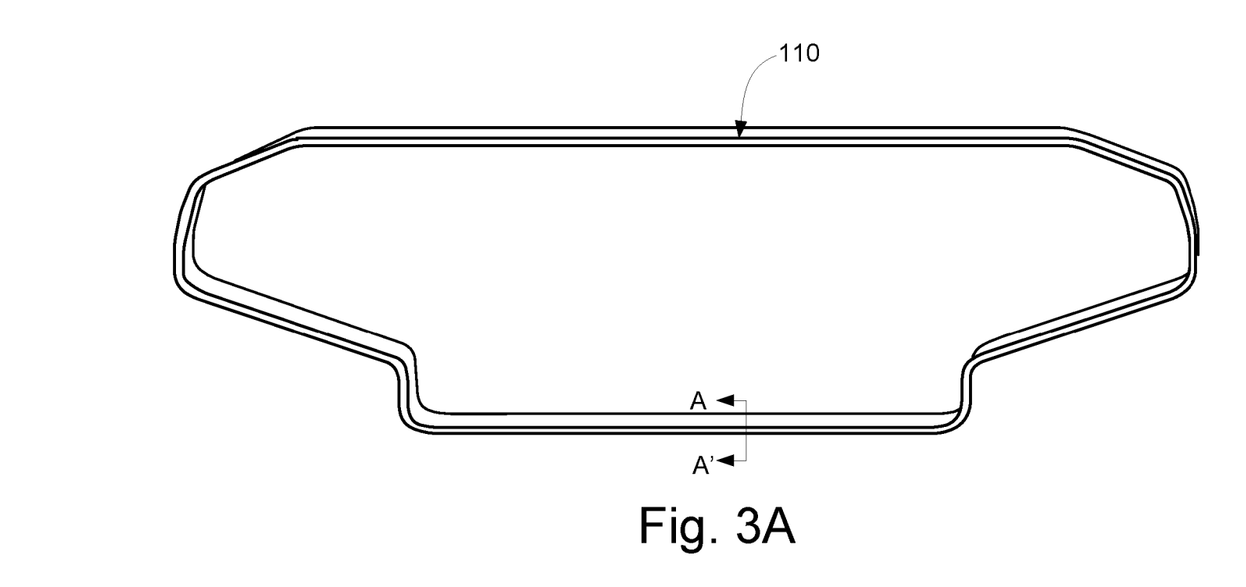
FIG. 3A illustrates one embodiment of a seal element that may be attached to an engagement surface of a carrier shell.

FIG. 3A illustrates one embodiment of a seal element 110 that is adapted to be disposed about a sealing periphery of one of the carrier shells 20. This seal element 110 is shaped to match the sealing periphery of an engagement surface to which it attaches and thus provides a continuous seal around that periphery. The sealing element 110 may be formed from any number of conventional sealing materials, including, without limitation, rubbers or synthetic polymers. Generally it is desirable that the sealing element be flexible with a medium durometer hardness, have high chemical resistance to oils bodily fluids and cleaning chemicals. Further it is desirable that the material had high tear and tensile strength ratings, low surface tackiness and a low coefficient of friction. If the sealing element is to be bonded or overmolded to a carrier, it should include chemical bonding properties that allow for bonding to polycarbonate. Preferably, the material should have a low compression set and a broad service temperature range. Suitable materials include, without limitation, Versaflex® OM3060, Versollan® OM1255 NX-1 and Versaflex® CE3620 all of which are manufactured by PolyOne Corporation of Avalon Lakem Ohio.

Figure 3B:
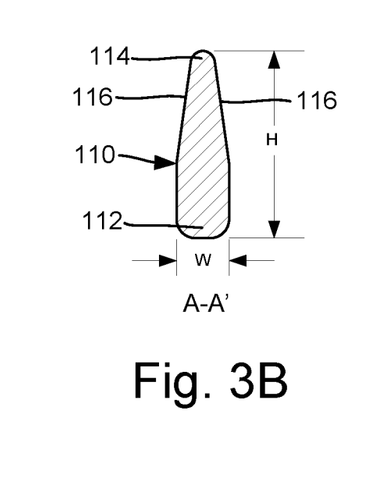
FIGS. 3B-3D illustrates a cross-sectional views of varying embodiments of the seal element of FIG. 3A.
Figures 3C, 3D:
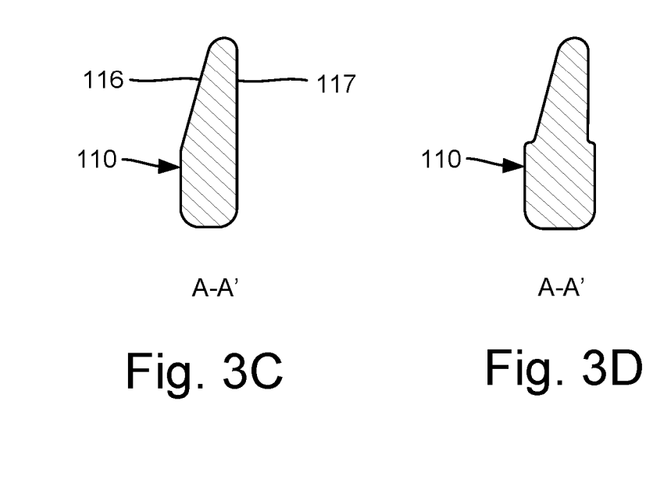

As shown in FIG. 3B, which is a cross-section of the seal element taken along reference A-A' of FIG. 3A, a body of the seal element 110 is elongated (i.e., in cross-section) between its base 112 and its tip 114. That is, the height 'H' of the seal element 110 is typically longer than its width 'W'. Typically, the height to width ratio (e.g., aspect ratio) is at least 1.5:1 and more typically at least 2:1. Larger aspect ratios are possible. In the illustrated embodiment, the seal element 110 equally tapers from a wider base 112 to a narrower tip 114. In this embodiment, the side surfaces 116 of the seal element are identical. FIG. 3C illustrates an alternate embodiment of the seal element 110 wherein one side surface 116 slopes and another sidewall surface 117 is substantially vertical. In use, the more angled side surface 116 is the outer surface of the seal (e.g., from the carrier interior) while the more vertical surface is the inner surface of the seal. This arrangement, provides the outer surface a greater slope prior to contacting the sloped surface as discussed herein. FIG. 3D illustrates a seal element having a wider base. Notwithstanding the wider base, which is typically designed for insertion within a recessed groove around an engagement surface, the upper end of the seal element maintains a significant aspect ratio.

Figure 4A:
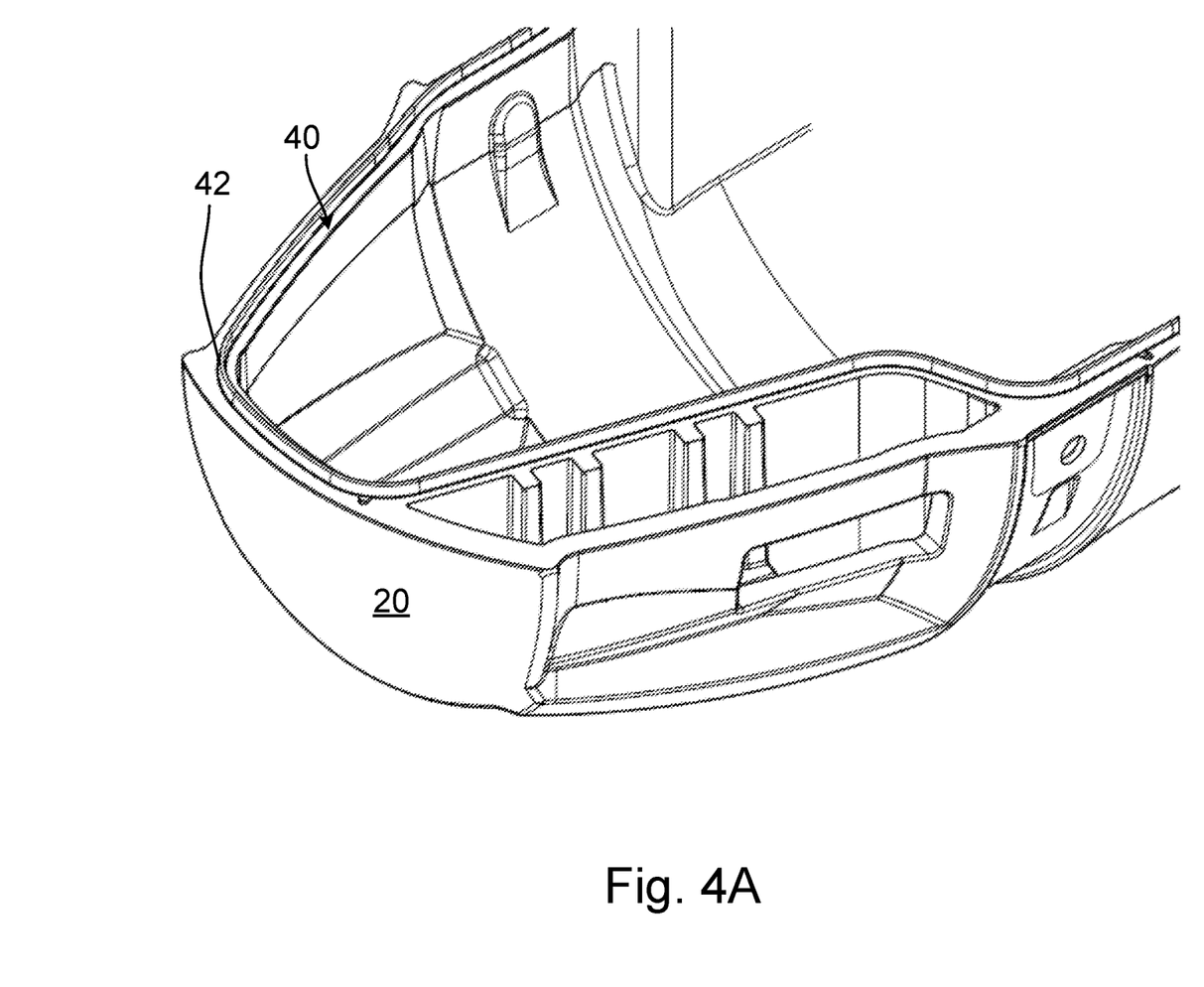
FIG. 4A illustrates a carrier shell having an engagement surface with a recessed groove for receiving a portion of a sealing element.
Figure 4B:
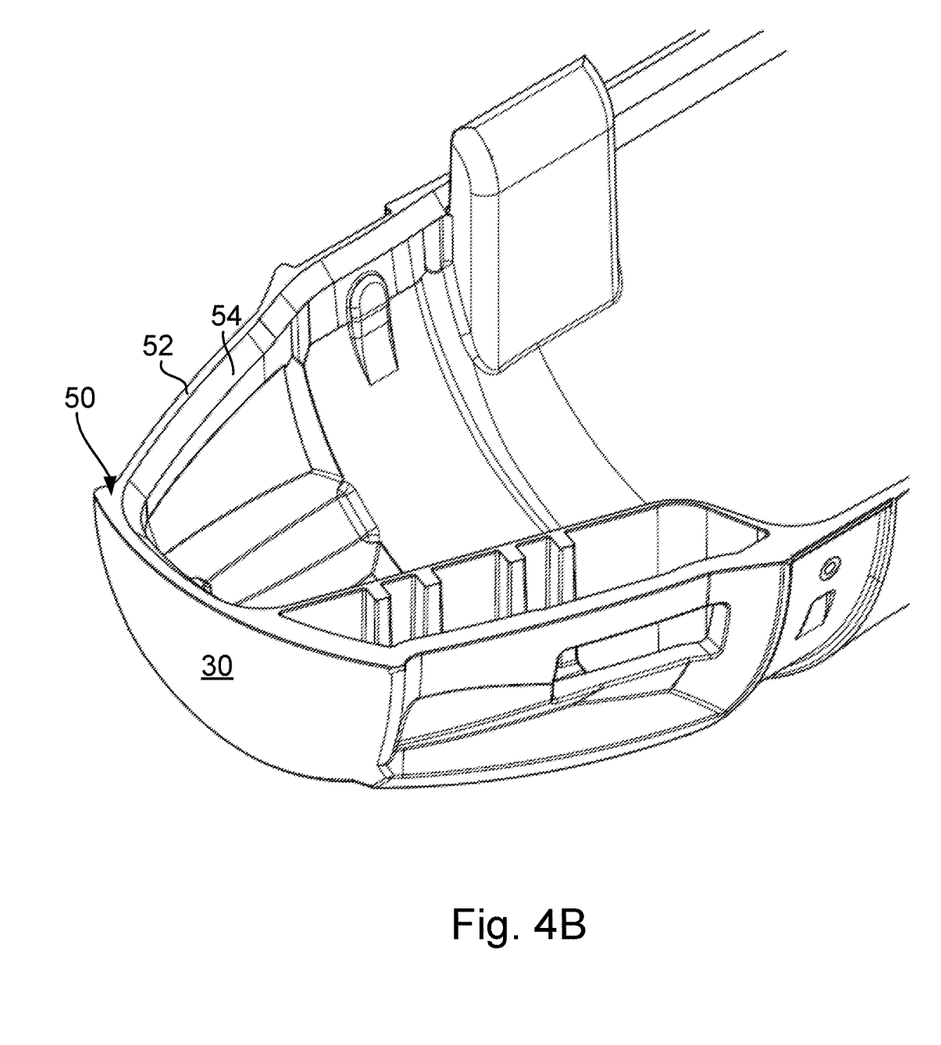
FIG. 4B illustrates a carrier shell having an engagement surface with a sloped surface for engaging a distal end of a sealing element attached to a mating engagement surface.

In any embodiment, the base portion 112 is adapted for fixed connection with an engagement surface of one of the carrier shells. For instance, a lower surface of the base portion 112 may be attached about the periphery of an engagement surface. In an arrangement, an adhesive attaching the base portion 112 the engagement surface may provide a fluid tight interface there between. In another arrangement, the engagement surface may utilize a recessed groove that receives the base portion 112 of the sealing element 110. In such an arrangement, the base portion of the sealing element may be adhered within the recessed groove or over-molded into the groove. FIG. 4A illustrates a close-up view of a portion of a first carrier shell 20 that is adapted to receive the sealing element 110 on its engagement surface 40. In this embodiment, the engagement surface 40 includes a recess or groove 42 that extends around the periphery of the engagement surface 40. The groove is sized to conformably receive the base portion 112 of the sealing element 110 therein. FIG. 4B illustrates a close-up view of a portion of a second carrier shell 30. As shown, the engagement surface 50 has a generally flat upper surface 52 and a sloped surface 54 disposed around the inside edge of the upper surface.

Figure 5A:
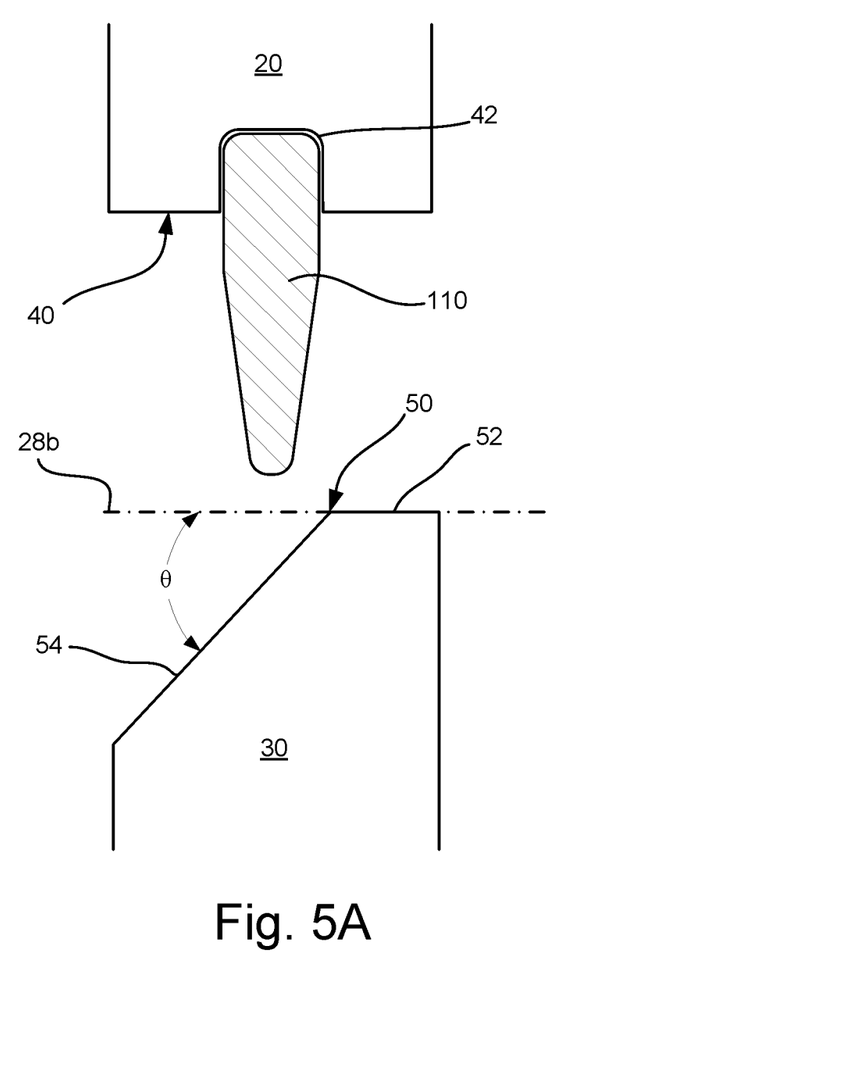
FIG. 5A illustrates a cross-sectional view of a seal element disposed in a groove in a first engagement surface and a mating engagement surface having a sloped surface.
Figure 5B:
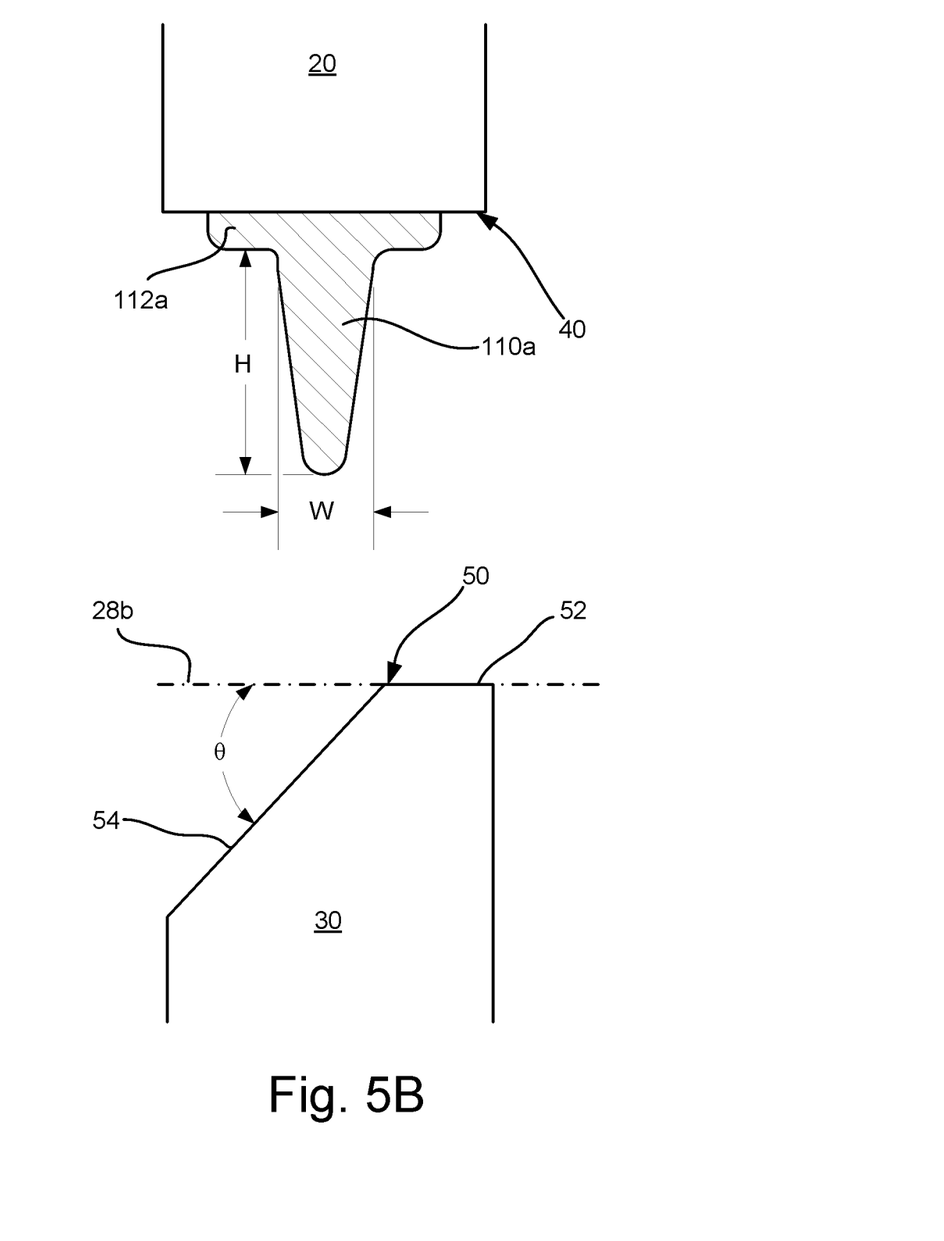
FIG. 5B illustrates cross-sectional view of a seal element disposed on a generally flat surface of a first engagement surface and a mating engagement surface having a sloped surface.

As illustrated in FIG. 5A, the base end of the sealing element 110 (e.g., of FIG. 3B) is disposed within the groove 42 formed about a periphery of the engagement surface to attach the sealing element 110 to the engagement surface 40. Once attached, a portion of the body of the elongated sealing element 110 extends above the engagement surface 40. Stated otherwise, a cantilevering portion of the sealing element extends above or away from the engagement surface 40 to the free distal end. Variations are possible. As illustrated in FIG. 5B, a sealing element 110a may have a wider base end 112a attached directly to an engagement surface 40 of a carrier shell 20 free of a recessed groove. Though having a wider base end, the sealing element 110a still includes a cantilevered portion having a height H that is greater than a width W of the cantilevered portion.

As further illustrated in FIGS. 5A and 5B, the sealing element 110, 110a as attached to the first engagement surface 40 of the first shell 20, generally aligns above the second engagement surface 50 of the second shell 30 prior to the shells being closed. As noted above, the second engagement surface 50 has an upper surface 52 and a sloped surface 54. As illustrated, the upper surface 52 is generally planar with the reference plane 28b defined by the closed geometric shape of the second engagement surface. See also FIG. 2. The sloped surface 54 is disposed at an angle θ relative to the reference plane 28b. The angle θ is typically at least 30 degrees. More commonly the angle is at least 45 degrees. As shown, the tip of the sealing element 110, 110a is preferably disposed above (e.g., aligned) with the sloped surface such that the sealing element engages the sloped surface as the carrier shells close.

Figure 6A:
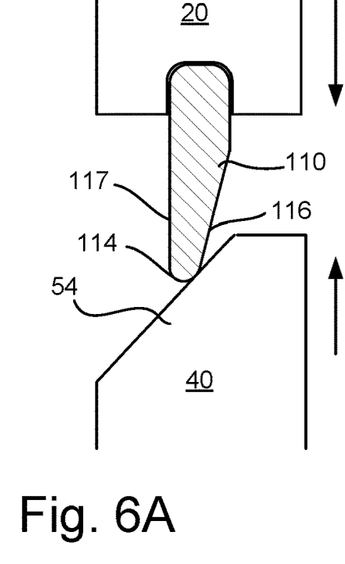
FIGS. 6A-6C illustrate cross-sectional views of the illustration of FIG. 5A moving between an open configuration and a closed configuration.
Figure 6B:
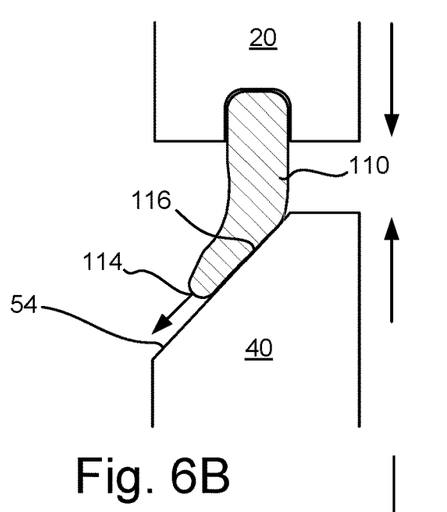
Figure 6C:
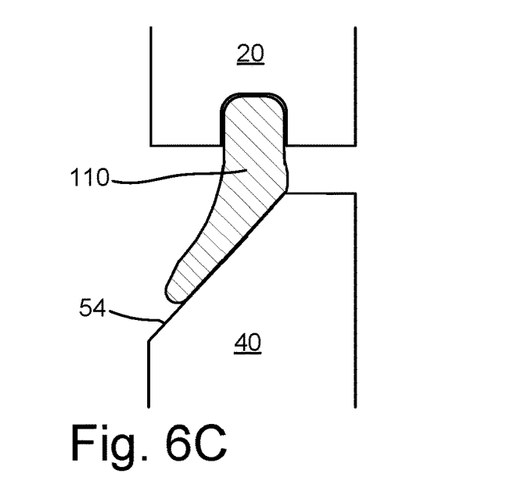

FIGS. 6A-6C illustrate the deflection of the seal element 110 (e.g., of FIG. 3C) as the first and second shells are closed. As shown in FIG. 6A, as the shells 20, 30 begin to move toward one another, the tip 114 of the seal element 110 attached to the first shell 20 contacts the sloped surface 54 of the second shell. Use of the seal element 110 having a vertical inside side surface 117 and a sloped outside side surface 116 effectively pre-biases the sealing element relative to the sloped surface 54 facilitating engagement and deflection of the sealing element. However, this is not strictly required. As the shells 20, 30 continue being advanced toward one another, the tip 114 of the seal element slides down the sloped surface 54 such that a side surface 116 of the seal element 110 is pressed against the sloped surface 54. See FIG. 6B. Such advancement may continue until the first and second shells are in a closed position as illustrated in FIG. 6C. As will be appreciated, the seal element 110 primarily deflects along its length to form a seal between its side surface 116 and the sloped surface 54. However, some compression of the seal element 110 is possible. Nonetheless, the force required to energize the seal is reduced compared to a seal that forms primarily through compression. Further, such a seal may have a larger contact length with the mating sloped surface than a seal that is compressed between two mating surfaces. Further, as the distal end of the cantilevered portion of the seal element 110 extends above the reference plane defined by the first engagement surface 40 and deflects around the periphery of sloped surface of the mating engagement surface when the shells are closed, the sealing element may conform to irregularities between the mating engagement surfaces 40, 50 about their peripheries. That is, even if the engagement surfaces of the shells are not perfectly matched (e.g., one shell is slightly warped), the cantilevering of the elongated portion of the sealing element allows it to account for such variations at different locations around the peripheries of the engagement surfaces.

FIGS. 1, 2 and 7A-7D illustrate one non-limiting embodiment of a latching mechanism. As illustrated, these latching or connecting mechanisms comprise a pair of latch assemblies 90a, 90b that releasably attach the first and second shells 20, 30 in the closed position. Each of the latch assemblies 90a, 90b (hereafter 90) includes a latch pawl 126 having a hooked tip. The latch assemblies also have an internal bias force member (e.g., spring coil, leaf spring, etc.) that permits linear movement of the pawl member 126 between a first position and a second position (e.g., an extended position and a retracted position). The latch pawl 126 and bias force member are connected to one of the shell members such that the hooked tip of the pawl 126 may engage a detent on the other shell.

The latch assemblies 90 are disposed within a receiving recess or pocket formed in the front corner of the shell members 20, 30. As noted above, each latch assembly 90 is disposed outside of the periphery of the engagement surface 40 or 50 such that the latch assembly is outside the sealed cargo area formed by the engagement surfaces 40, 50 when the shells are closed. As shown, each latch assembly 90 includes a base member that is disposed within the pocket 60 formed in the respective shell member. See FIG. 2. This base member supports the latch pawl 126 as well as the bias force member. Once inserted within the pocket 60, a latch handle 124 is interconnected to the pawl 126. More specifically, the latch handle is disposed through an aperture formed in the housing wall. In the present embodiment, the latch handle may be secured to the pawl 126 utilizing a screw or other fastening means. Once connected, the latch handle prevents the latch mechanism 90 from being removed from the pocket 60. As illustrated in FIGS. 7A-7D, the elongated aperture through the sidewall allows the latch handle to move forward and backward between an extended position (e.g., FIG. 7A) and retracted position (e.g., FIG. 7B). Likewise, movement of the latch handle allows for compressing the bias force member, thereby retracting the pawl 126.

Figures 7A, 7B:
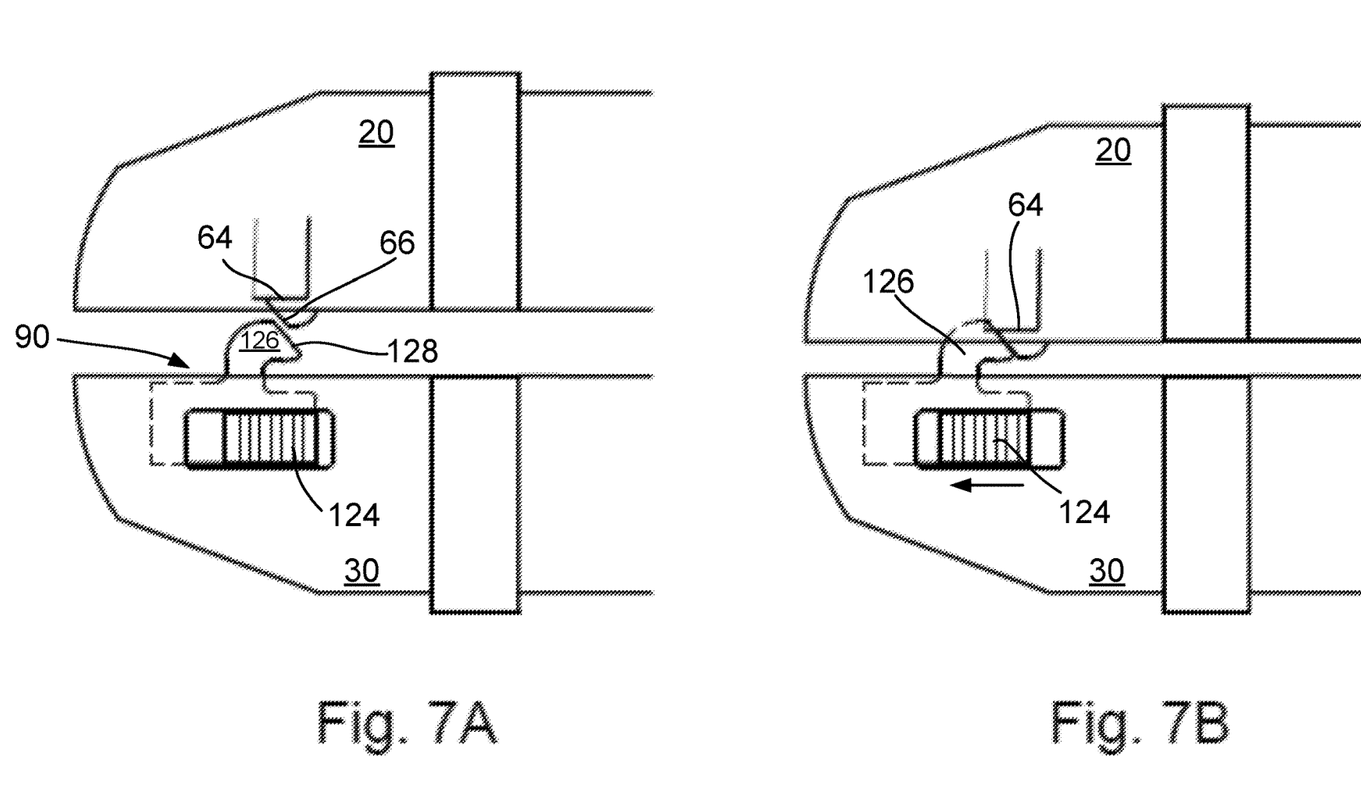
FIGS. 7A-7D illustrate enlarged side views a latching mechanism, before, during and after closing the first and second shell members of the carrier vessel.
Figure 7C:
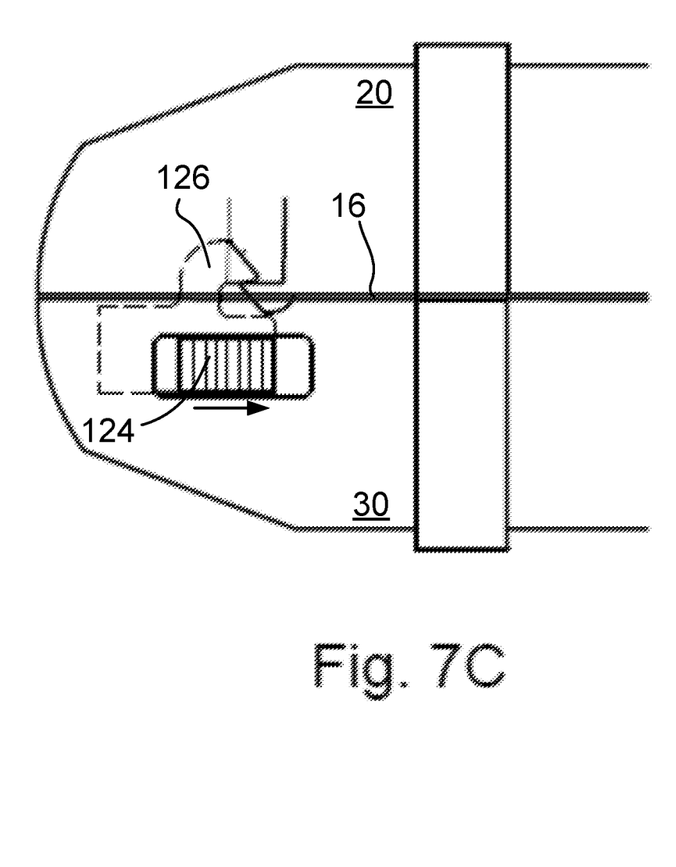
Figure 7D:
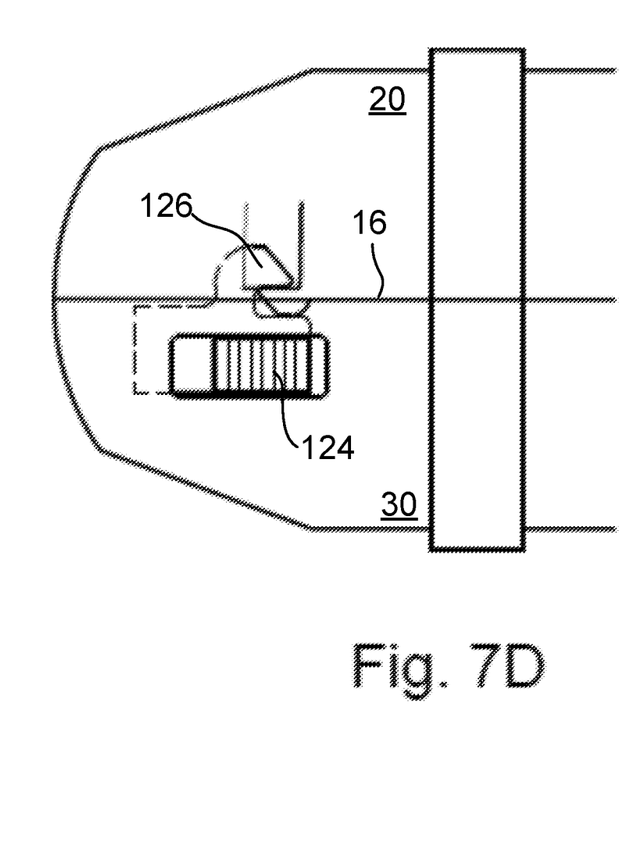

The shell member opposing the latch assembly 90 includes a detent 64 that is adapted to receive the hooked end of the pawl 126. Specifically, as shown in FIG. 7A, a top surface 128 of the pawl 126 is slanted and is adapted to engage a ramped surface 66 within the shell member 30 including the detent 64. When the first and second shell members are closed, the pawl 126 engages the ramped surface 66 of the detent 64, thereby compressing the bias force member and allowing the pawl 126 to automatically retract (See FIG. 7B). When the first and second shells close (See FIG. 7C), the hooked end of the pawl 126 falls over the top edge of the ramp 66 into the detent 64. At this point, the latch holds the carrier shut and allows sending into the tube system without additional force even if the shells are not fully engaged at their interface 16. Once placed in a pneumatic tube the carrier may fully shut. See FIG. 7D. Alternatively, the carrier will fully shut if a user applies sufficient force to allow the latch to fully engage. A user may open the shells by grasping the latch handles (e.g., with both thumbs on the first and second latching assemblies 90a, 90b) and retracting the pawls from the detents.

Importantly, the relationship between the pawl 126 and the detent 64 is such that when the pawl 126 is engaged with the detent the sealing element 110 is energized. That is, the latch assembly is a single stage latch where simply closing the shell members engages the latch and provides sufficient energizing force to form a seal between the first and second engagement surfaces. That is, a user is not required to provide additional compressive force after closing the first and second shells to energize the seal. Such a latch may be referred to as a single stage latch or a slam latch. Use of such a single stage latch provides a further benefit. Specifically, if the carrier is launched though a pneumatic tube prior to the latches being properly engaged, the compression applied to the shells of the carrier by the pneumatic tube (e.g., via the wear bands) will tend to complete the engagement of the latches. Furthermore, due to use of the elongated and cantilevered seal 110 with a mating sloped surface 54, in contrast to, for example, flat contact between two planar surfaces having a generally flat sealing gasket disposed there between, less force is required to engage the two shell members 20, 30 or open the carrier 10. This facilitates the opening and closing of the carrier 10.

The foregoing description of the present invention has been presented for purposes of illustration and description. Furthermore, the description is not intended to limit the inventions to the forms disclosed herein. Consequently, variations and modifications commensurate with the above teachings, and within the skill and knowledge of the relevant art, are part of the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

The invention claimed is:

1. A pneumatic carrier for use in a pneumatic tube transport system, comprising:
   a first shell having a first engagement surface extending about a first periphery of the first shell;
   a sealing element attached to the first engagement surface, the sealing element having a base end attached to the first engagement surface and a body that cantilevers away from the first engagement surface to a free distal tip, wherein in a cross-sectional profile a cantilevering portion of the sealing element is elongated having an length between the base end and the free distal tip that is at least twice the greatest width of the cantilevering portion of the sealing element as measured in cross-section;
   a second shell having a second engagement surface extending about a second periphery of the second shell, wherein the second periphery defines a reference plane, and wherein the second engagement surface includes a sloped surface disposed at an angle relative to the reference plane;
   a pivotal coupling attaching the first shell and the second shell permitting movement between an open position and a closed position where the first engagement surface and the second engagement surface are juxtaposed; and
   wherein a side surface of the sealing element between the base end and the distal tip engages the sloped surface of the second engagement surface in the closed position.

2. The pneumatic carrier of claim 1, wherein the first engagement surface further comprises a recessed groove, wherein the base end of said sealing element is at least partially disposed within the recessed groove.

3. The pneumatic carrier of claim 1, wherein the sealing element deflects along its length between the base end and the distal tip when the side surface engages the sloped surface.

4. The pneumatic carrier of claim 1, wherein the sloped surface is disposed at an angle of at least 30 degrees relative to the reference plane.

5. The pneumatic carrier of claim 4, wherein the sloped surface is disposed at an angle of at least 45 degrees relative to the reference plane.

6. The pneumatic carrier of claim 1, wherein the sloped surface slants toward an interior of the second shell.

7. The pneumatic carrier of claim 1, further comprising:
   first and second wear bands attached to at least one of the first shell and the second shell.

8. The pneumatic carrier of claim 7, wherein the first and second wear bands each connect the first shell and the second shell, wherein the first and second wear bands form the pivotal connection.

9. The pneumatic carrier of claim 1, further comprising:
   a latch having a first portion attached to one of the first and second shells, wherein the latch is configured to engage the other of the first and second shells to secure the shells in the closed position.

10. The pneumatic carrier of claim 9, wherein the latch comprises:
    a biased pawl attached to one of the first and second shells;
    a ramped surface attached to the other of said first and second shells; and
    a detent formed at the end of said ramped surface, wherein the ramp engages said pawl as the shells move from the open position to the closed position and wherein the detent receives the pawl in the closed position.

11. The pneumatic carrier of claim 9, wherein the latch is disposed outside of the peripheries of the engagement surfaces.

* * * * *